(12) United States Patent
Pasolini et al.

(10) Patent No.: US 8,411,030 B2
(45) Date of Patent: Apr. 2, 2013

(54) POINTING AND CONTROL DEVICE AND METHOD FOR A COMPUTER SYSTEM

(75) Inventors: Fabio Pasolini, S. Martino Siccomario (IT); Paolo Bendiscioli, Pavia (IT); Francesco Vocali, Empoli (IT); Fabio Biganzoli, Jerago (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 1258 days.

(21) Appl. No.: 12/196,966

(22) Filed: Aug. 22, 2008

(65) Prior Publication Data

US 2009/0058803 A1 Mar. 5, 2009

(30) Foreign Application Priority Data

Aug. 23, 2007 (EP) .................................... 07425538

(51) Int. Cl.
*G09G 5/00* (2006.01)
*G06F 3/033* (2006.01)
*G06F 3/02* (2006.01)
*G01C 17/38* (2006.01)

(52) U.S. Cl. ........ 345/156; 345/157; 345/158; 345/161; 345/169; 702/92

(58) Field of Classification Search .......... 345/156–169; 702/92

See application file for complete search history.

(56) References Cited

U.S. PATENT DOCUMENTS

| 6,636,826 | B1 | 10/2003 | Abe et al. |
| 2002/0059027 | A1* | 5/2002 | An et al. ............... 702/2 |

FOREIGN PATENT DOCUMENTS

| WO | 01/43063 A1 | 6/2001 |
| WO | 2006/090197 A1 | 8/2006 |
| WO | WO2006/090197 | * 8/2006 |

OTHER PUBLICATIONS

Foley, J.D. et al., "Computer Graphics-Principles and Practice," 1996, Chapter 5: Geometrical Transformation, pp. 201-227, Addison-Wesley Publishing Company, Inc., US.

* cited by examiner

*Primary Examiner* — Amr Awad
*Assistant Examiner* — Andre Matthews
(74) *Attorney, Agent, or Firm* — Seed IP Law Group PLLC

(57) ABSTRACT

A pointing and control device for a computer system, the device having a body that can be maneuvered by a user; and an inertial sensor fixed to the body for supplying first signals correlated to the orientation of the body with respect to a gravitational field acting on the inertial sensor. The device moreover includes a magnetometer fixed to the body for supplying second signals correlated to the orientation of the body with respect to the Earth's magnetic field acting on the magnetometer and processing modules for determining an orientation of the body in an absolute reference system, fixed with respect to the Earth's magnetic field and gravitational field on the basis of the first signals and second signals.

28 Claims, 9 Drawing Sheets

POINTING AND CONTROL DEVICE AND METHOD FOR A COMPUTER SYSTEM

BACKGROUND

1. Technical Field

The present disclosure relates to a pointing and control device and a pointing and control method for a computer system.

2. Description of the Related Art

As is known, in order to improve the interaction of a user with a computer system, use of three-dimensional control and pointing devices has been invoked. Unlike typical two-dimensional control and pointing devices, such as a mouse, joy-stick or track-ball, just to mention some examples, three-dimensional devices detect their own displacements or rotations according to three distinct independent axes and hence enable a greater freedom of control. For example, three-dimensional devices can be used for simulating objects that are normally manipulated by the operator during use, such as pointers for presentations or sports implements in the case of videogames.

The movements are in general detected by gyroscopes and accelerometers. In particular, accelerometers are used to determine the direction of the acceleration of gravity, which defines an absolute reference, and linear accelerations, while gyroscopes are used to detect rotations and supply signals indicating the angular velocity of the pointing device about one or more axes. The acceleration and angular velocity signals must then be integrated one or more times to determine the position and direction of the pointing device to be used for control operations, such as control of the position of a cursor on the monitor of a computer system.

The operations of integration lead, however, to drawbacks, in particular because inevitable offsets and noise present in the acceleration and angular velocity signals add up and increase over time. The precision of control tends to decrease, and in order to eliminate temporarily the errors, periodic operations of recalibration or reset are necessary, which can temporarily interrupt use of the pointing device.

Following upon reset events and upon elimination of errors, sudden deviations may also occur, which in any case render control problematical and far from precise.

BRIEF SUMMARY

The present disclosure provides a pointing and control device, such as a handheld device, and a pointing and control method for a computer system that will reduce or be free from the limitations described above.

In accordance with one embodiment of the present disclosure, a pointing and control device is provided that includes a body, which can be maneuvered by a user, an inertial sensor fixed to the body for supplying first signals correlated to the orientation of the body with respect to a gravitational field acting on the inertial sensor, a magnetometer fixed to the body for supplying second signals correlated to the orientation of the body with respect to the Earth's magnetic field acting on the magnetometer, and a processor for determining an orientation of the body in an absolute reference system, fixed with respect to the Earth's magnetic field and to the gravitational field, on the basis of the first signals and of the second signals.

In accordance with another embodiment of the present disclosure, a computer system is provided that includes a computer and a pointing and control device coupled to the computer and formed in accordance with the foregoing embodiment.

In accordance with a method of the present disclosure, a pointing and control method for an electronic computer system is provided that includes providing a body, which can be maneuvered by a user, determining an orientation of the body with respect to the Earth's gravitational field, determining an orientation of the body with respect to the Earth's magnetic field, and determining an orientation of the body in an absolute reference system, fixed with respect to the Earth's magnetic field and gravitational field.

In accordance with another embodiment of the present disclosure, a pointer device for a computer is provided, the device including a hand-holdable body, a first sensor mounted in the body and adapted to supply first signals correlated to the orientation of the body with respect to gravitational field of the Earth, a second sensor mounted in the body and adapted to supply second signals correlated to the orientation of the body with respect to the Earth's magnetic field; and a processor adapted to receive the first and second signals and to output a control signal to the computer, the processor comprising a first processing module adapted to determine in a relative reference system fixed with respect to the body a relative gravitational field component derived from the first signal and a relative magnetic field component derived from the second signal, and a second processing module adapted to determine the orientation of the body in the absolute reference system on the basis of the relative gravitational field components and the relative magnetic field components derived from the first processing module.

BRIEF DESCRIPTION OF THE SEVERAL VIEWS OF THE DRAWING(S)

For a better understanding of the disclosure, an embodiment thereof is now described, purely by way of non-limiting example and with reference to the attached drawings, wherein.

DETAILED DESCRIPTION

Figure 1:
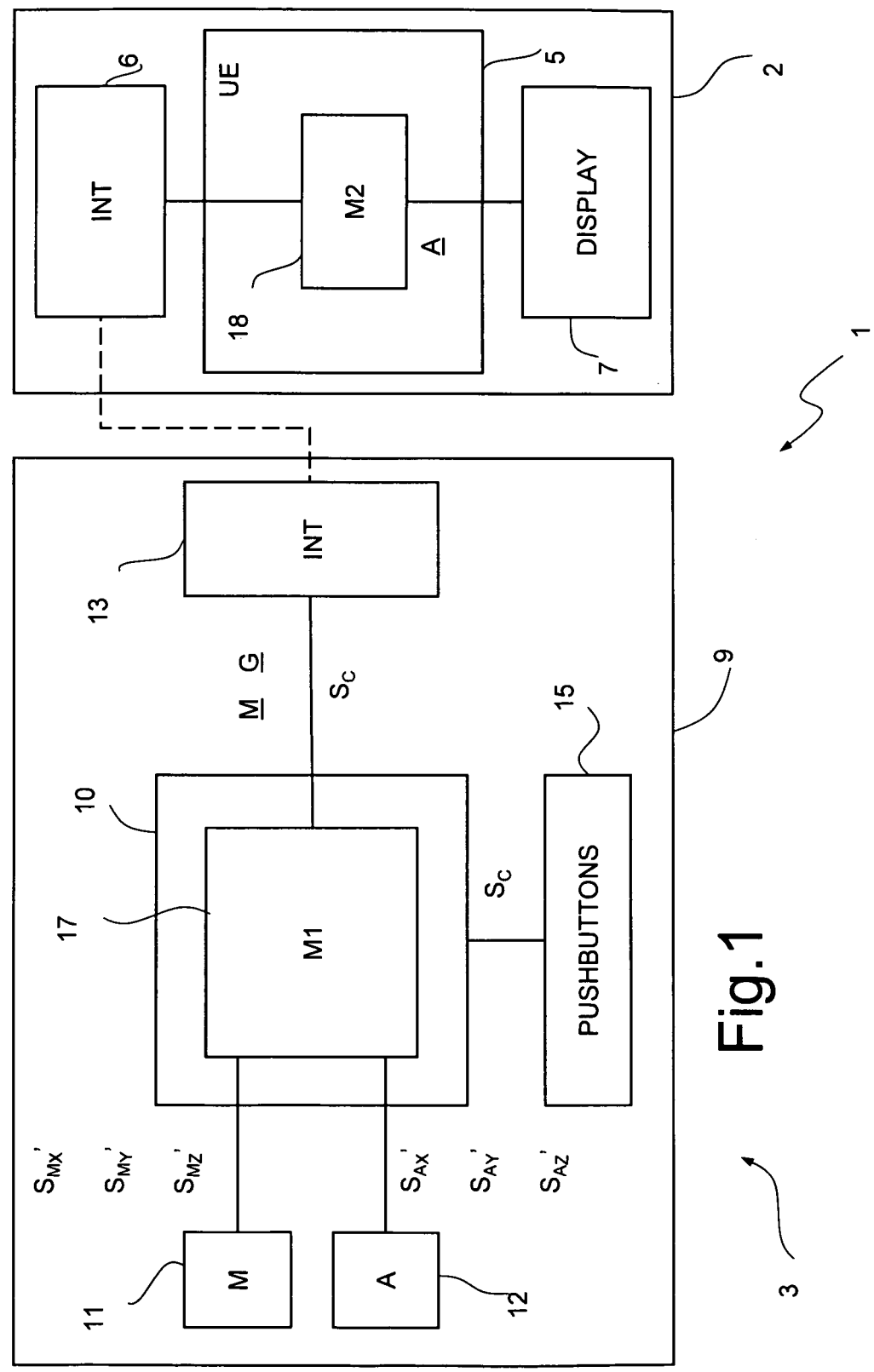
FIG. 1 is a simplified block diagram of a computer system provided with a pointing and control device according to a first embodiment of the present disclosure.

With reference to FIG. 1, a computer system, designated as a whole by the reference number 1, includes a computer 2 and a pointing and control device 3.

The computer 2 is equipped with a processing unit 5 and further includes a communication interface 6 and a display 7. In the embodiment described herein, in particular, the communication interface 6 is of the wireless type, but a communication interface 6 of the hardwired type could also be used.

The pointing and control device 3 has a body 9 shaped so as to be held and maneuverable by a user in three-dimensional space. Inside the body 9, the pointing and control device 3 further includes a control unit 10, for example a microcontroller or a DSP (Digital Signal Processor), a magnetometer 11, an inertial sensor, in particular an accelerometer 12, and a further communication interface 13, which is also of a wireless type, for being communicably coupled with the communication interface 6 of the computer 2. Control pushbuttons 15 are carried on the body 9 and are coupled in communication to the control unit 10 inside the body 9.

The pointing and control device 3 further includes a first processing module 17, and there is a second processing module 18, which, in the embodiment described herein, reside, respectively, in the control unit 10 and in the processing unit 5.

Figure 2:
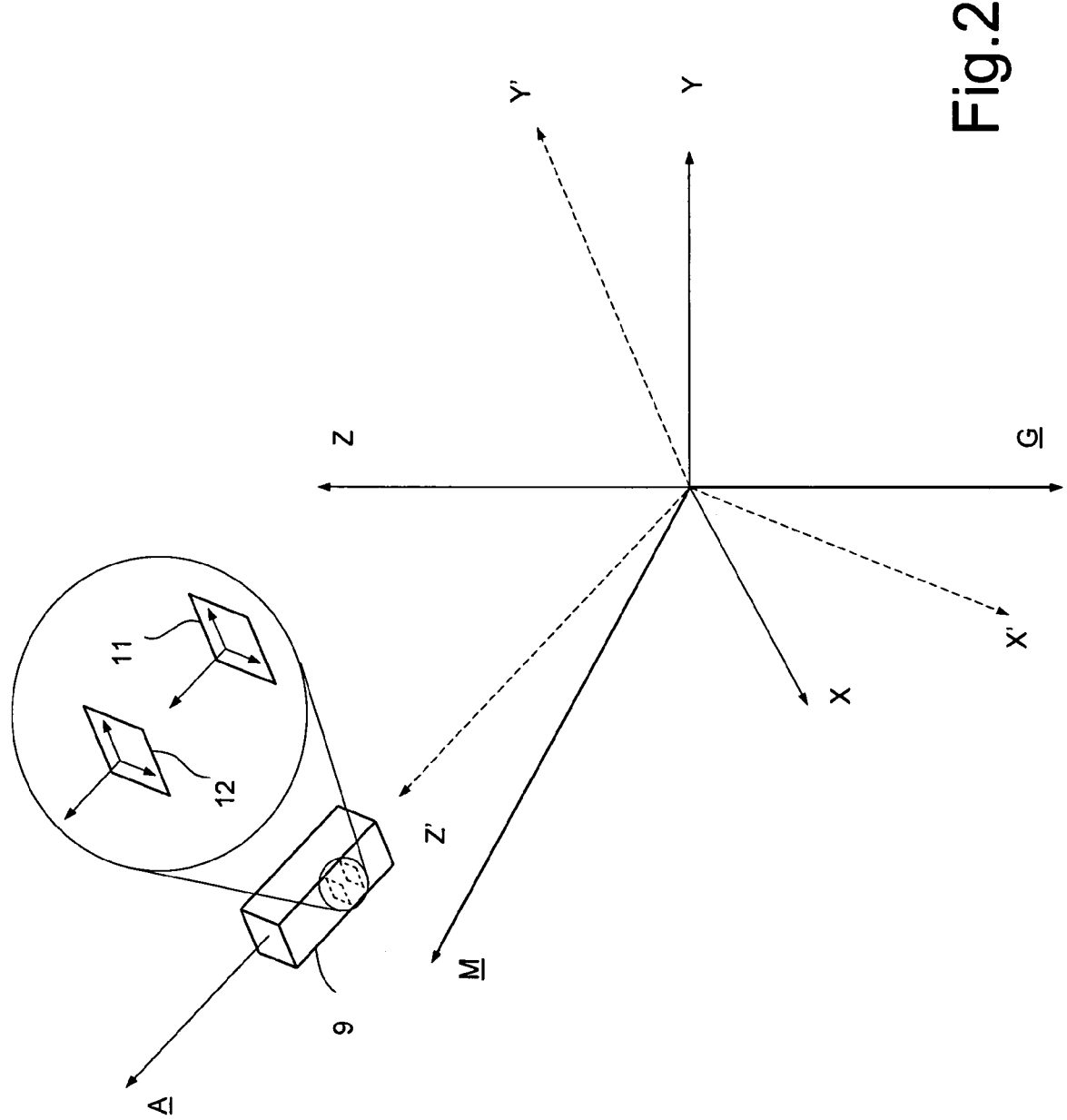
FIG. 2 is a graph that shows an absolute reference system and a relative reference system used by the pointing and control device of FIG. 1.

The magnetometer 11 and the accelerometer 12 are of a MEMS (Micro-Electro-Mechanical Systems) type and both have three independent and mutually perpendicular detection axes. The magnetometer 11 and the accelerometer 12 are moreover set so as to provide measurements corresponding to one and the same relative reference system X', Y', Z' with axes parallel to respective detection axes of the magnetometer 11 and of the accelerometer 12, as shown in FIG. 2.

The magnetometer 11, in particular, responds to static magnetic fields and generates magnetic-field signals $S_{MX}'$, $S_{MY}'$, $S_{MZ}'$ indicating magnetic-field components along respective axes of the relative reference system X', Y', Z'. In the absence of disturbance magnetic fields, the magnetic-field signals $S_{MX}'$, $S_{MY}'$, $S_{MZ}'$ supplied by the magnetometer 11 are indicative of the direction and intensity of the Earth's magnetic field.

The accelerometer 12 generates acceleration signals $S_{AX}'$, $S_{AY}'$, $S_{AZ}'$ indicating accelerations to which the accelerometer 12 itself is subjected. In addition, the acceleration signals $S_{AX}'$, $S_{AY}'$, $S_{AZ}'$, when the body 9 is at rest, are indicative of the direction and intensity of the Earth's gravitational field.

The pushbuttons 15 can be operated manually by a user who manipulates the pointing and control device 3 and can be used for providing a plurality of functions typical of pointing devices (functions associated to the left and right keys of the mouse, scrolling, double click, selection of an enlargement factor, and so forth).

The control unit 10 receives the magnetic-field signals $S_{MX}'$, $S_{MY}'$, $S_{MZ}'$ and the acceleration signals $S_{AX}'$, $S_{AY}'$, $S_{AZ}'$, which are processed in the first processing module 17 as described hereinafter, for determining a magnetic-field vector M and a gravitational-field vector G, indicating the direction and intensity of the Earth's magnetic field and gravitational field, respectively. In addition, the control unit 10 detects activation of the pushbuttons 15 and supplies in response corresponding control signals, here designated as a whole by $S_C$. The magnetic-field vector M, the gravitational-field vector G, and the control signals $\overline{S_C}$ are supplied to the computer 2 through the communication interface 13.

The second processing module 18, residing in the processing unit 5, receives the magnetic-field vector M, the gravitational-field vector G, and the control signals $\overline{S_C}$ through the communication interface 6. The magnetic-field vector M and the gravitational-field vector G are used for determining an absolute reference system $\overline{XYZ}$ fixed with respect to the ground and an orientation of the body 9 of the pointing and control device 3 in the absolute reference system XYZ, by means of transformations of co-ordinates.

The orientation of the pointing and control device 3 thus determined is used for controlling a flow of operations executed by the computer 2. The operations can be of any type normally executed through a pointing and control device. For example, the position of a cursor appearing on the display 7 is controlled; operations of scrolling of pages or images appearing on the display 7 are carried out; selection of a factor of enlargement of the pages or images appearing on the display 7 is made; operations of control for opening, modifying, saving, and closing files are executed; interaction of the cursor appearing on the display 7 with virtual objects or icons appearing on the display 7 is determined; operations of configuration and management of the resources of the computer 2 are carried out, etc.

Figure 3:
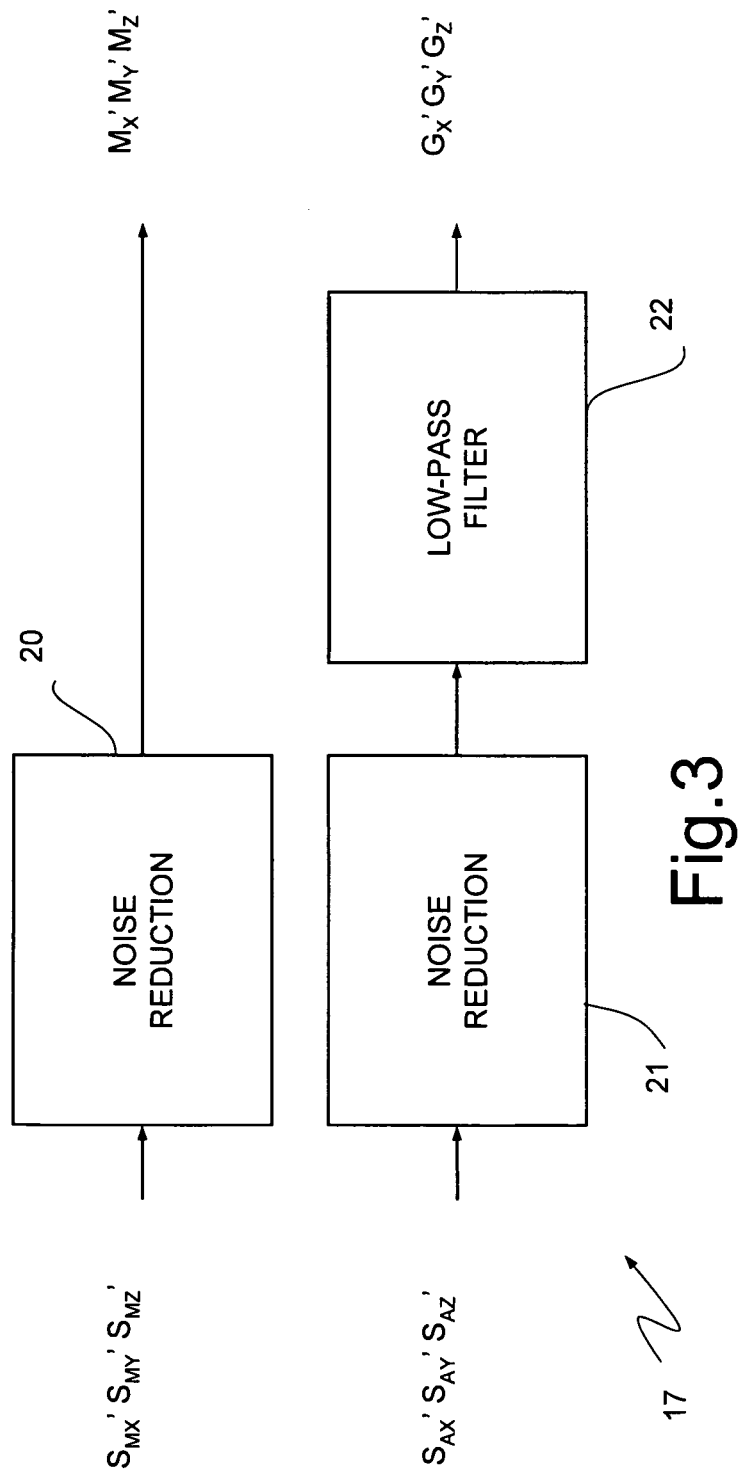
FIG. 3 is a more detailed block diagram of a first portion of the pointing and control device of FIG. 1.

With reference to FIG. 3, the first processing module 17 comprises noise-reduction filters 20, 21 and a low-pass filter 22.

The noise-reduction filters 20, 21, in themselves known, operate respectively on the magnetic-field signals $S_{MX}'$, $S_{MY}'$, $S_{MZ}'$ and on the acceleration signals $S_{AX}'$, $S_{AY}'$, $S_{AZ}'$ for reducing the noise of a mechanical and electronic type.

The filtered magnetic-field signals $S_{MX}'$, $S_{MY}'$, $S_{MZ}'$ define respective relative magnetic-field components $M_X'$, $M_Y'$, $M_Z'$ of the magnetic-field vector M (in the relative reference system X'Y'Z'), which is supplied to the communication interface 13.

The low-pass filter 22 is applied to the acceleration signals $S_{AX}'$, $S_{AY}'$, $S_{AZ}'$ and extracts from each the respective d.c. component, which is determined basically by the action of the gravitational field. The d.c. components of the acceleration signals $S_{AX}'$, $S_{AY}'$, $S_{AZ}'$ define respective relative gravitational-field components $G_X'$, $G_Y'$, $G_Z'$ of the gravitational-field vector G (in the relative reference system X'Y'Z'), which is supplied to the output of the low-pass filter 22.

Figure 4:
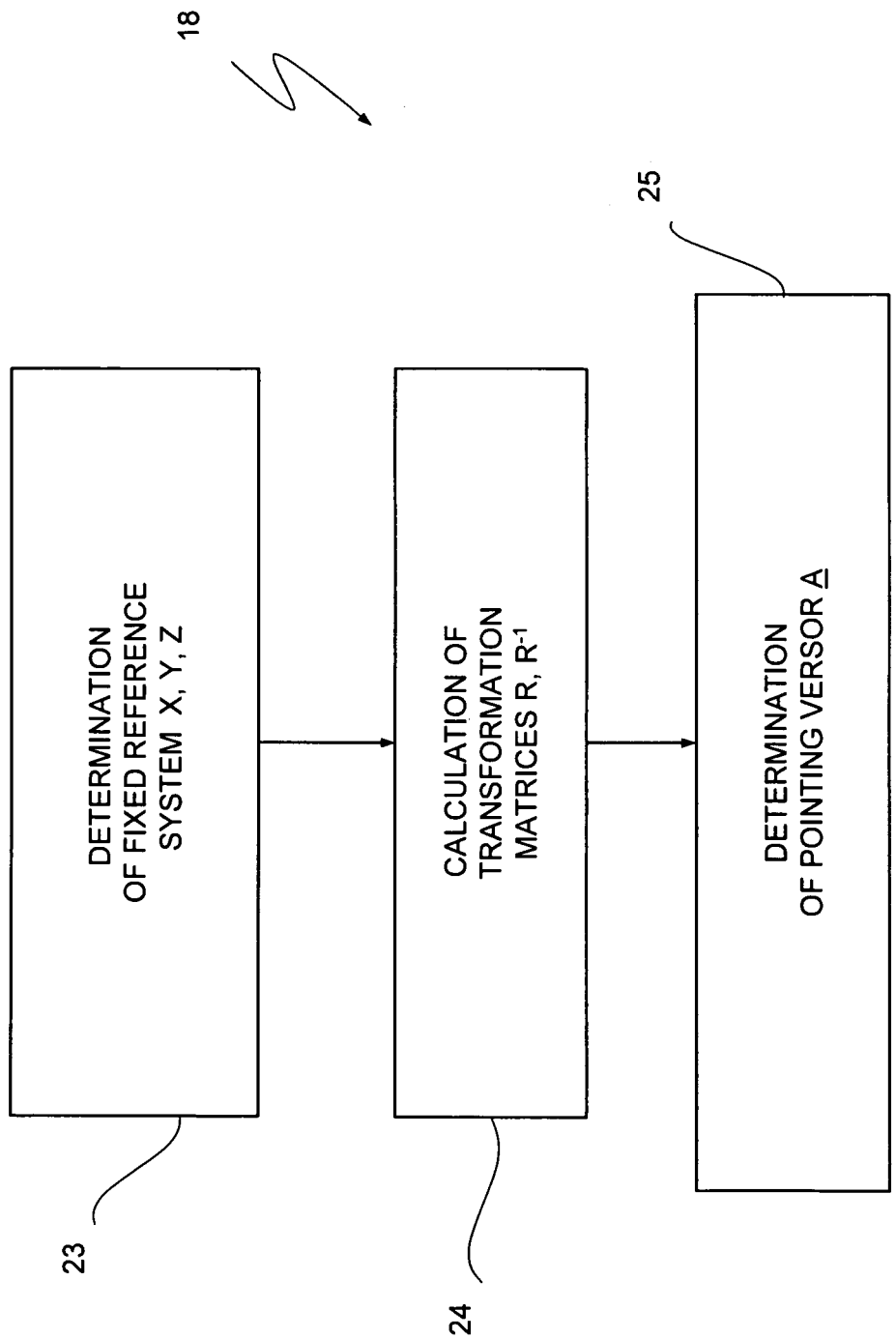
FIG. 4 is a more detailed block diagram of a second portion of the pointing and control device of FIG. 1.

As is shown in FIG. 4, the second processing module 18 comprises a first calculation stage 23, a second calculation stage 24, and a third calculation stage 25, cascaded to one another.

Figure 5B:
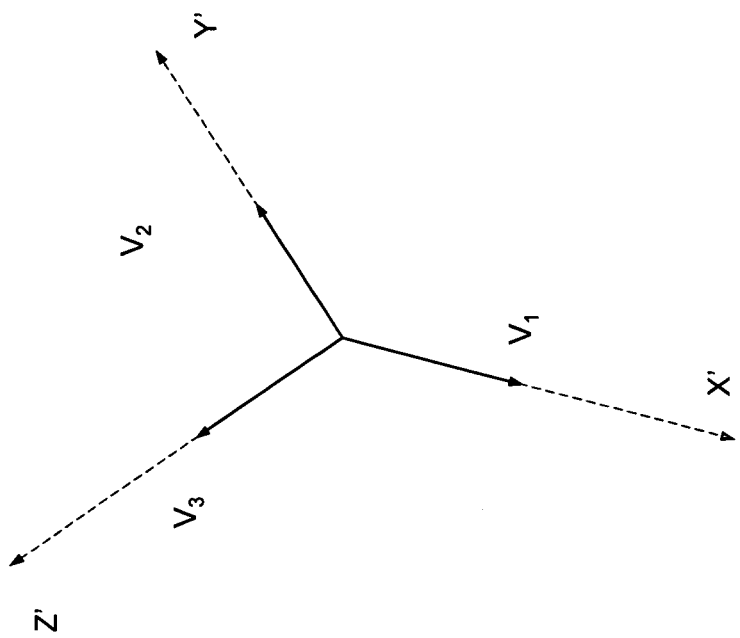
FIG. 5b is a graph that illustrates in greater detail the relative reference system of FIG. 2.
Figure 5A:
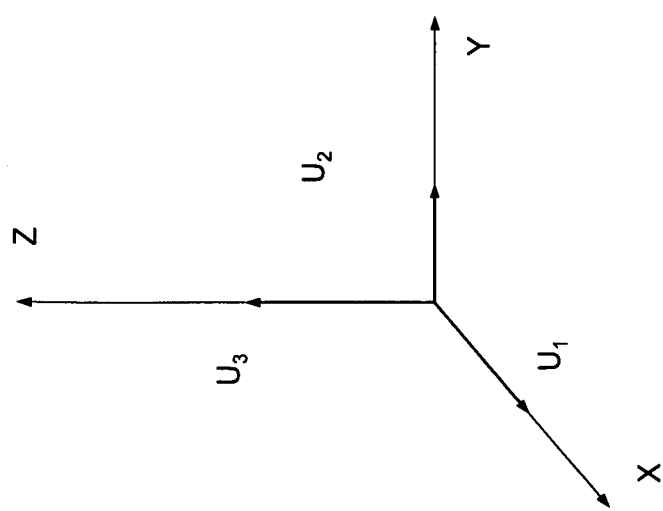
FIG. 5a is a graph that illustrates in greater detail the absolute reference system of FIG. 2.

In detail, the first calculation stage 23 determines the absolute reference system X, Y, Z starting from the magnetic-field vector M and from the gravitational-field vector G, which are linearly independent. More precisely, relative co-ordinates (i.e., with respect to the relative reference system X'Y'Z') are calculated for three first versors $U_1$, $U_2$, $U_3$, which are mutually perpendicular and are each parallel to a respective axis of the absolute reference system X, Y, Z (FIGS. 2 and 5a). Calculation is based upon the relative magnetic-field components $M_X'$, $M_Y'$, $M_Z'$ of the magnetic-field vector and upon the relative gravitational-field components $G_X'$, $G_Y'$, $G_Z'$ of the gravitational-field vector $\underline{G}$ and upon the following equations:

$$U_1 = \frac{-\underline{G}}{\|-\underline{G}\|} = [\; U_{11} \quad U_{12} \quad U_{13} \;]^T$$

$$U_2 = \frac{-\underline{G} \wedge \underline{M}}{\|-\underline{G} \wedge \underline{M}\|} = [\; U_{21} \quad U_{22} \quad U_{23} \;]^T$$

$$U_3 = \frac{-\underline{G} \wedge (-\underline{G} \wedge \underline{M})}{\|-\underline{G} \wedge (-\underline{G} \wedge \underline{M})\|} = [\; U_{31} \quad U_{32} \quad U_{33} \;]^T \text{ where}$$

$$\underline{M} = [\; M_X' \quad M_Y' \quad M_Z' \;]^T$$

$$\underline{G} = [\; G_X' \quad G_Y' \quad G_Z' \;]^T$$

Using the first versors $U_1$, $U_2$, $U_3$, the second calculation stage 24 defines a first transformation matrix R, as follows:

$$R = [U_1 \; U_2 \; U_3] = \begin{bmatrix} U_{11} & U_{21} & U_{31} \\ U_{12} & U_{22} & U_{32} \\ U_{13} & U_{23} & U_{33} \end{bmatrix}$$

The second calculation stage 24 calculates also a second transformation matrix $R^{-1}$, which is the inverse of the transformation matrix R and enables transformation of co-ordinates from the relative reference system X', Y', Z' to the absolute reference system X, Y, Z.

The third calculation stage 25 determines the orientation of the relative reference system X', Y', Z' in the absolute reference system X, Y, Z, fixed with respect to the ground. In particular, the third calculation stage 25 determines the direction, in the absolute reference system X, Y, Z, of a pointing versor A (FIG. 2), which is fixed with respect to the body 9 and has a pre-set and known direction in the relative reference system X', Y', Z'. In the embodiment described herein, the pointing versor A is directed as the versor $V_3$' (axis Z') but could have any direction. In greater detail, the third calculation stage 25 uses the second transformation matrix $R^{-1}$ for calculating the direction of the pointing versor A according to the relation $$A = R-1A'$$

where A' indicates the direction of the pointing versor in the reference system X', Y', Z'.

Furthermore, the third processing module 25 determines absolute co-ordinates of three second versors $V_1$, $V_2$, $V_3$, each of which is parallel to a respective axis of the relative reference system X', Y', Z', as shown in FIG. 4b (the direction of the second versors $V_1$, $V_2$, $V_3$ in the relative reference system X', Y', Z' is hence known). The transformation made by the third calculation stage 25 is the following:

$$V_1 = R^{-1}V_1'$$

$$V_2 = R^{-1}V_2'$$

$$V_3 = R^{-1}V_3'$$

where $V_1'$, $V_2'$, $V_3'$ are the co-ordinates of the second versors $V_1$, $V_2$, $V_3$ in the relative reference system X', Y', Z'.

The orientation of the body 9 in the absolute reference system X, Y, Z is thus completely determined.

Advantageously, the use of the magnetometer 11 and of the accelerometer 12 enables determination, in the relative reference system X', Y', Z', of the direction of two vectors fixed with respect to the ground and to the absolute reference system X, Y, Z and linearly independent (magnetic-field vector M and gravitational-field vector G). It is therefore possible to determine the orientation of the body 9, without resorting to operations of integration. The pointing and control device 3 does not suffer from problems due to the amplification of offset and noise superimposed on the significant signals.

The orientation of the body 9 and the control signals $S_C$ generated by means of the pushbuttons 15 are used for performing control actions, as mentioned previously. The control actions are determined by the application program that is run by the computer 2. For example, the orientation of the body 9 can be used for controlling the position of a cursor or of a pointer appearing on the display 7, for determining the position and orientation of a three-dimensional virtual object (a sports implement in a videogame; maneuvering devices of a training simulator, such as a flight simulator, etc.) or for determining the interaction between a virtual object maneuvered through the pointing and control device 3 and other virtual objects created and controlled by the application program run on the computer 2.

Figure 6:
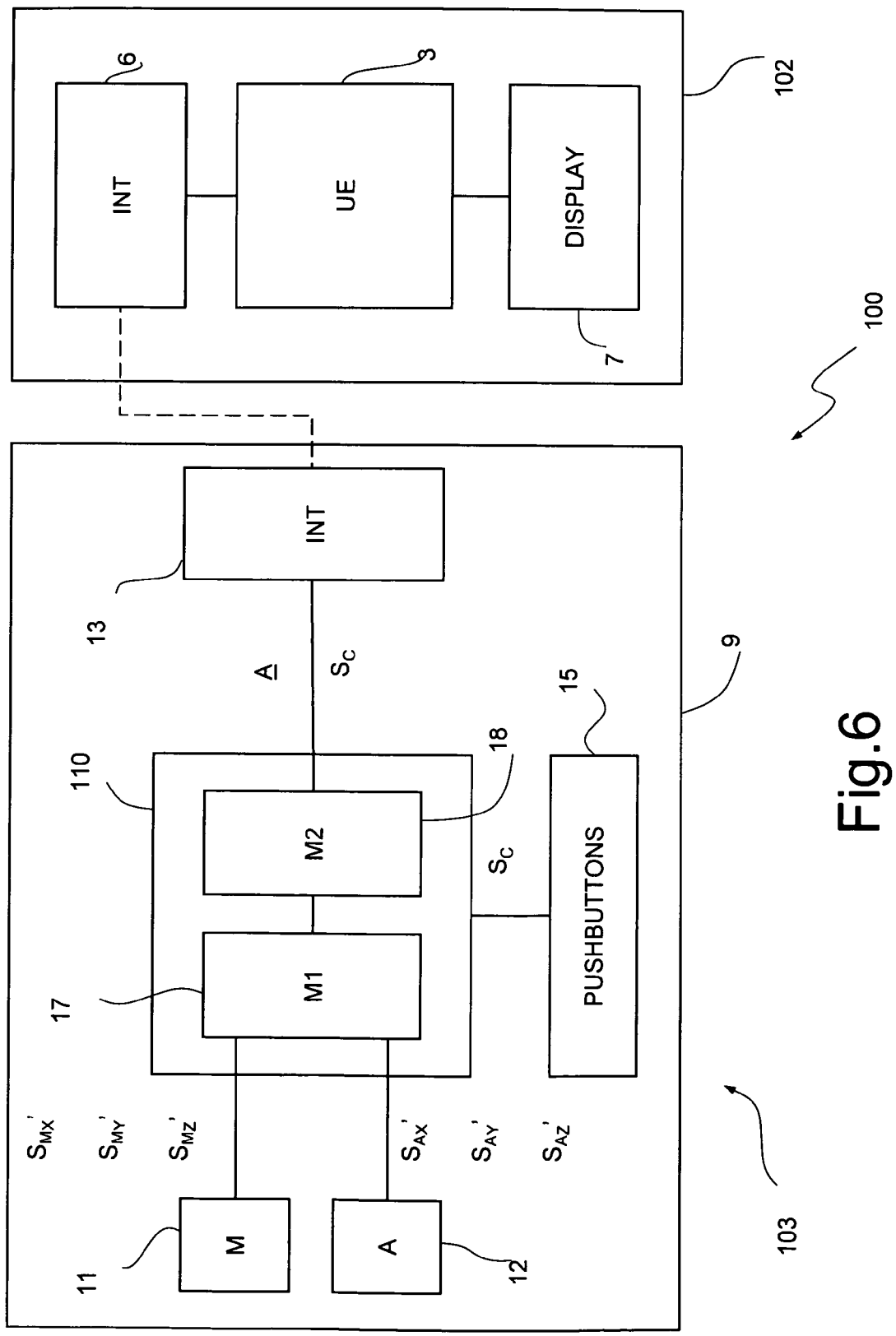
FIG. 6 is a simplified block diagram of a computer system provided with a pointing and control device according to a second embodiment of the present disclosure.

According to the embodiment of FIG. 6, where parts that are the same as the ones already shown are designated by the same reference numbers, a pointing and control device 103 of a computer system 100 includes a control unit 110, in which both the first processing module 17 and the second processing module 18, operating as described previously, reside. Consequently, in this case the control unit 110 gives directly the direction of the pointing versor A and of the second versors $V_1$, $V_2$, $V_3$, which are used by a processing unit 105 of a computer 102. The first processing module 17 and the second processing module 18 are both provided on board the body 9.

Figure 7:
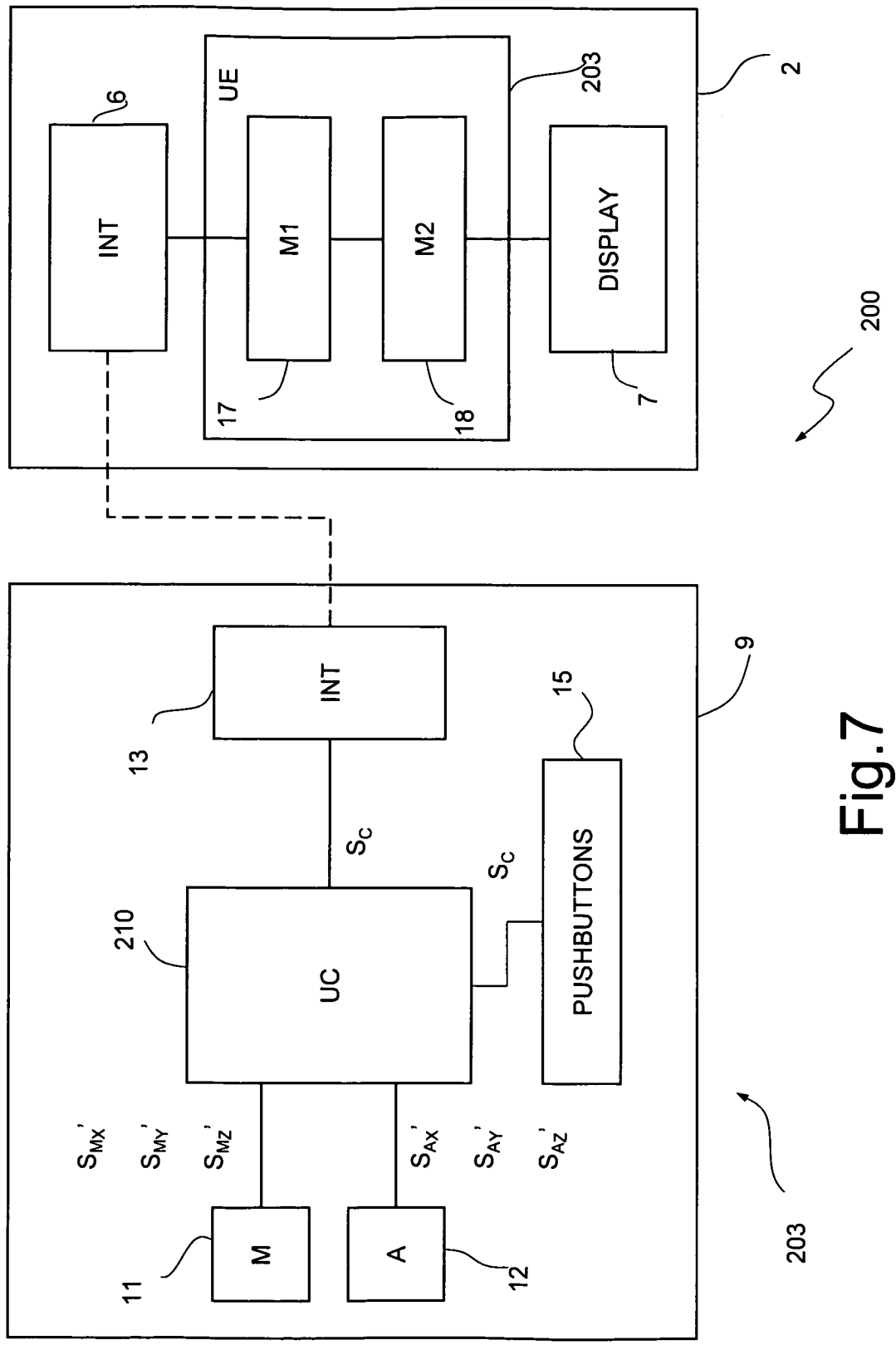
FIG. 7 is a simplified block diagram of a computer system provided with a pointing and control device according to a third embodiment of the present disclosure.

A third embodiment of the disclosure is illustrated in FIG. 7. In this case, a computer system 200 includes a computer 202 and a pointing and control device 203, which are provided, respectively, with a processing unit 205 and a control unit 210. The first processing module 17 and the second processing module 18 both reside in the processing unit 205, whilst the control unit 210 carries out sampling of the magnetic-field signals $S_{MX}'$, $S_{MY}'$, $S_{MZ}'$ and of the acceleration signals $S_{AX}'$, $S_{AY}'$, $S_{AZ}'$.

Figure 8:
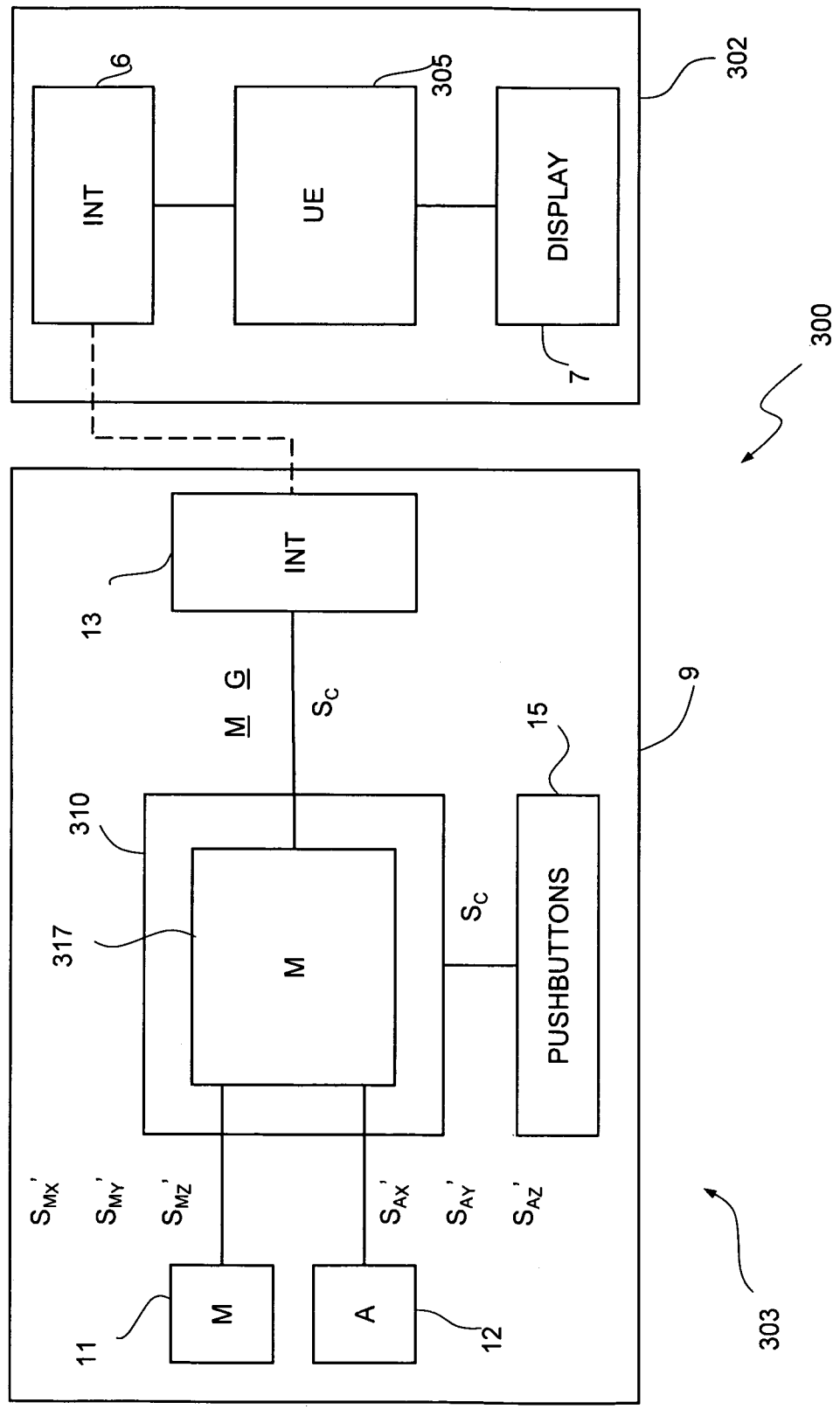
FIG. 8 is a simplified block diagram of a computer system provided with a pointing and control device according to a fourth embodiment of the present disclosure.

According to a fourth embodiment of the disclosure, (illustrated in FIGS. 8 and 9) a computer system 300 includes a computer 302 and a pointing and control device 303, equipped with a processing unit 305 and a control unit 310, respectively.

Figure 9:
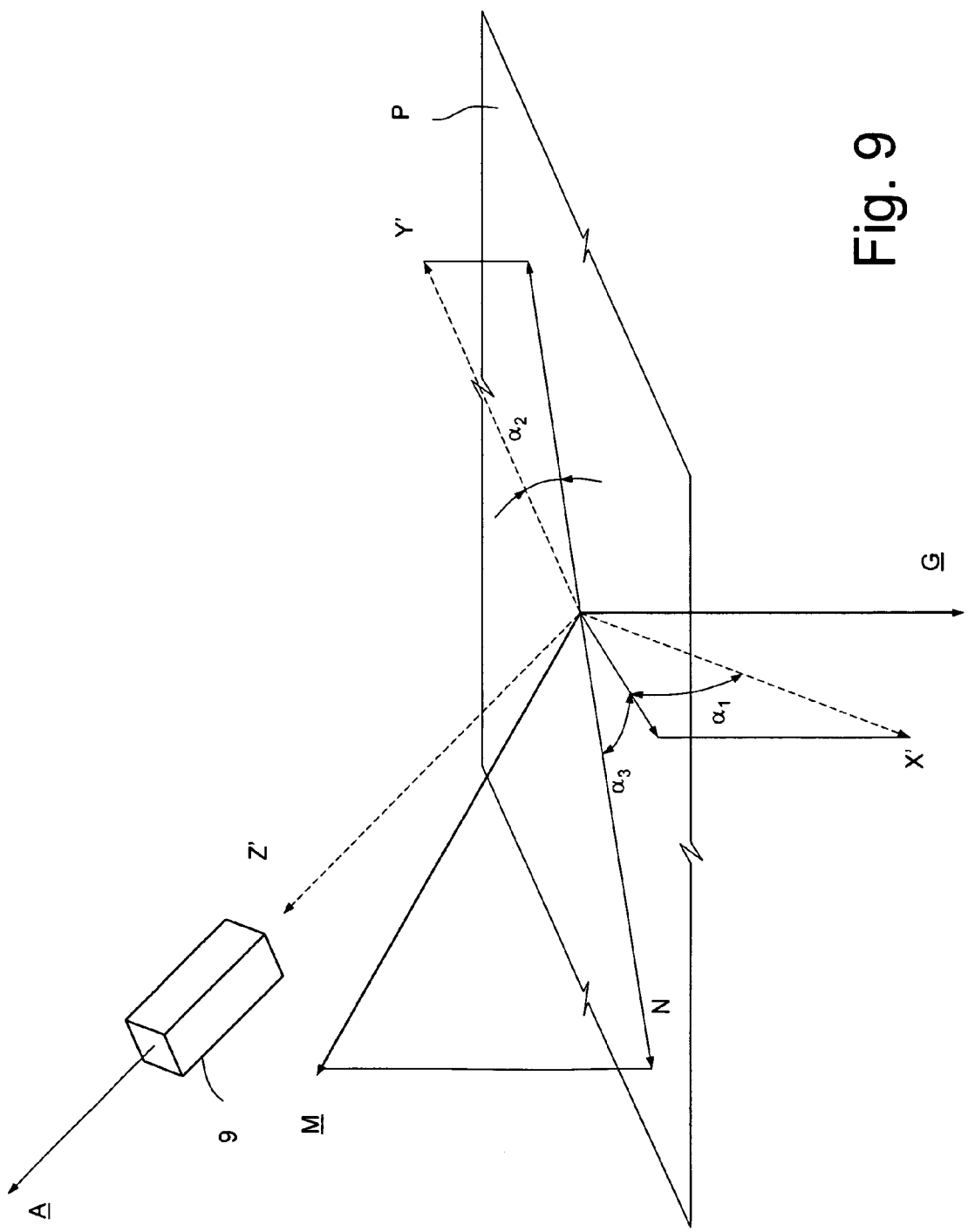
FIG. 9 is a graph that shows an absolute reference system used by the pointing and control device of FIG. 8.

A processing module 317, residing in the control unit 310, receives the magnetic-field signals $S_{MX}'$, $S_{MY}'$, $S_{MZ}'$ and the acceleration signals $S_{AX}'$, $S_{AY}'$, $S_{AZ}'$ from the magnetometer 11 and the accelerometer 12 and uses them for determining a pitch angle $\alpha_1$, a roll angle $\alpha_2$, and a yaw angle $\alpha_3$ of the body 9 of the pointing and control device 303 (FIG. 9). The accelerometer 12 is used as inclinometer for determining the pitch angle $\alpha_1$ and the roll angle $\alpha_2$ with respect to the gravitational-field vector G, by means of the acceleration signals $S_{AX}'$, $S_{AY}'$, $S_{AZ}'$. In greater detail, the acceleration signals $S_{AX}'$, $S_{AY}'$, $S_{AZ}'$ are filtered for extracting the d.c. components, which are correlated to the components of the gravitational-field vector G according to respective detection axes of the accelerometer 12. The d.c. components of the acceleration signals $S_{AX}'$, $S_{AY}'$, $S_{AZ}'$ are used for identifying the pitch angle $\alpha_1$ and the roll angle $\alpha_2$.

The magnetic-field signals $S_{MX}'$, $S_{MY}'$, $S_{MZ}'$ are used for determining the yaw angle $\alpha_3$ on the basis of the rotation of the body 9, to which the magnetometer 11 is fixed, in a horizontal plane P with respect to the direction of the magnetic North N, i.e., with respect to the projection of the magnetic-field vector M in the horizontal plane P. The pitch angle $\alpha_1$ and the roll angle $\alpha_2$ are used, together with the values of magnetic field $S_{MX}'$, $S_{MY}'$, $S_{MZ}'$ and in a way in itself known, in the determination of the direction of the magnetic North N to compensate for the tilt of the magnetometer 11. In practice, the gravitational-field vector G and the direction of the magnetic North N defined by the projection of the magnetic-field vector M in the horizontal plane P, define a fixed reference system with respect to the ground.

Once the pitch angle $\alpha_1$, the roll angle $\alpha_2$, and the yaw angle $\alpha_3$ have been obtained, the direction of the pointing axis A in the fixed reference system is also determined.

Also in this case, the orientation of the body 9 can be advantageously determined without any need to integrate the magnetic-field signals $S_{MX}'$, $S_{MY}'$, $S_{MZ}'$ and the acceleration signals $S_{AX}'$, $S_{AY}'$, $S_{AZ}'$ supplied by the magnetometer 11 and by the accelerometer 12.

According to one embodiment (not illustrated), the processing module resides in the processing unit 305 of the computer 302.

Finally, it is evident that modifications and variations may be made to the device and method described, without departing from the scope of the present disclosure, as defined in the annexed claims.

In particular, the absolute and relative reference systems can be defined differently.

The absolute reference system may be defined by any three linearly independent vectors, obtained from the magnetic vector $\overline{M}$ and the gravitational-field vector $\overline{G}$. For example, they may be determined starting from the magnetic vector $\overline{M}$ as follows:

$$U_1 = \frac{\overline{M}}{\|\overline{M}\|} = [\begin{array}{ccc} U_{11} & U_{12} & U_{13} \end{array}]^T$$

$$U_2 = \frac{\overline{M} \wedge \overline{G}}{\|\overline{M} \wedge \overline{G}\|} = [\begin{array}{ccc} U_{21} & U_{22} & U_{23} \end{array}]^T$$

$$U_3 = \frac{\overline{M} \wedge (\overline{M} \wedge \overline{G})}{\|\overline{M} \wedge (\overline{M} \wedge \overline{G})\|} = [\begin{array}{ccc} U_{31} & U_{32} & U_{33} \end{array}]^T$$

In principle, the absolute reference system even can be defined by vectors that are not mutually perpendicular (provided that they are linearly independent).

The relative reference system can have axes that are not parallel to the detection axes of the magnetometer and of the accelerometer, which in turn may not be parallel to one another.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a body configured for manual manipulation;
an inertial sensor fixed to the body and configured to supply first signals correlated to the orientation of the body with respect to a gravitational field acting on the inertial sensor;
a magnetometer fixed to the body and configured to supply second signals correlated to the orientation of the body with respect to the Earth's magnetic field acting on the magnetometer; and
a processor configured to determine an orientation of the body in an absolute reference system, fixed with respect to the Earth's magnetic field and to the gravitational field, on the basis of the first signals and of the second signals, the processor further configured to determine the relative co-ordinates of three first vectors that are parallel to three respective axes of the absolute reference system on the basis of the relations $$U_1 = \frac{-\overline{G}}{\|-\overline{G}\|}$$

$$U_2 = \frac{-\overline{G} \wedge \overline{M}}{\|-\overline{G} \wedge \overline{M}\|}$$

$$U_3 = \frac{-\overline{G} \wedge (-\overline{G} \wedge \overline{M})}{\|-\overline{G} \wedge (-\overline{G} \wedge \overline{M})\|}$$

where $U_1$, $U_2$, $U_3$ are the three first vectors, G is the Earth's gravitational field, and M is the Earth's magnetic field.

2. The device according to claim 1, wherein the processor includes a first processing module configured to determine, in a relative reference system fixed with respect to the body, relative gravitational-field components on the basis of the first signals and relative magnetic-field components on the basis of the second signals.

3. The device according to claim 2, wherein the first processing module includes a low-pass filter configured to extract d.c. components from the first signals and wherein the relative gravitational-field components are defined by respective d.c. components of the first signals.

4. The device according to claim 2, wherein the processor includes a second processing module configured to determine the orientation of the body in the absolute reference system on the basis of the relative gravitational-field components and of the relative magnetic-field components.

5. The device according to claim 4, wherein the second processing module includes a first processing stage configured to determine, in the relative reference system, the relative co-ordinates of the three first vectors parallel to respective axes of the absolute reference system.

6. The device according to claim 5, wherein the second processing module includes a second processing stage configured to determine, on the basis of the three first vectors, a transformation operator configured to transform co-ordinates from the relative reference system to the absolute reference system.

7. The device according to claim 6, wherein the second processing module includes a third processing stage configured to determine, in the absolute reference system, absolute co-ordinates of three second vectors parallel to respective axes of the relative reference system.

8. The device according to claim 7, wherein the third processing stage is configured to determine a direction, in the absolute reference system, of a pointing vector, fixed with respect to the body.

9. The device according to claim 1, wherein the processor is configured to determine a pitch angle, a roll angle, and a yaw angle of the body.

10. The device according to claim 9, wherein the pitch angle and the roll angle are correlated to the first signals, and the yaw angle is correlated to the second signals.

11. The device according to claim 1, wherein the processor is located at least in part in a control unit housed within the body.

12. The device according to claim 1, wherein the processor is located at least in part in a processing unit housed outside the body.

13. The device according to claim 1, wherein the magnetometer and the accelerometer are microelectromechanical devices.

14. A method, comprising:
   determining an orientation of a body with respect to the Earth's gravitational field;
   determining an orientation of the body with respect to the Earth's magnetic field; and
   determining an orientation of the body in an absolute reference system, fixed with respect to the Earth's magnetic field and gravitational field, including determining relative co-ordinates of three first vectors parallel to three respective axes of the absolute reference system on the basis of the relations $$U_1 = \frac{-G}{\|-G\|}$$

$$U_2 = \frac{-G \wedge M}{\|-G \wedge M\|}$$

$$U_3 = \frac{-G \wedge (-G \wedge M)}{\|-G \wedge (-G \wedge M)\|}$$

where $U_1$, $U_2$, $U_3$ are the first three vectors, G is the Earth's gravitational field, and M is the Earth's magnetic field.

15. The method according to claim 14, wherein the determining the orientation of the body in the absolute reference system includes determining, in a relative reference system fixed with respect to the body, relative gravitational-field components and relative magnetic-field components.

16. The method according to claim 15, wherein the determining orientation of the body in the absolute reference system includes determining on the basis of the relative gravitational-field components and of the relative magnetic-field components.

17. The method according to claim 15, wherein the determining the orientation of the body in the absolute reference system includes determining, in the relative reference system, relative co-ordinates of the three first vectors parallel to the three respective axes of the absolute reference system.

18. The method according to claim 1, wherein determining the orientation of the body in the absolute reference system includes determining, on the basis of the three first vectors, a transformation operator for transformation of co-ordinates from the relative reference system to the absolute reference system.

19. The method according to claim 18, wherein determining the orientation of the body in the absolute reference system includes determining, in the absolute reference system, absolute co-ordinates of three second vectors parallel to three respective axes of the relative reference system.

20. The method according to claim 18, wherein determining the orientation of the body in the absolute reference system includes determining a direction, in the absolute reference system, of a pointing vector that is fixed with respect to the body.

21. The method according to claim 14, wherein determining the orientation of the body in an absolute reference system includes determining a pitch angle, a roll angle, and a yaw angle of the body.

22. The method according to claim 14, wherein determining the orientation of the body with respect to the gravitational field includes using a microelectromechanical inertial sensor, and determining an orientation of the body with respect to the Earth's magnetic field includes using a microelectromechanical magnetometer.

23. The method according to claim 14, including performing operations of control of a computer on the basis of the orientation of the body in the absolute reference system.

24. A controller, comprising:
   a hand-holdable body;
   a first sensor mounted on the body and configured to supply first signals correlated to the orientation of the body with respect to the gravitational field of the Earth;
   a second sensor mounted on the body and configured to supply second signals correlated to the orientation of the body with respect to the Earth's magnetic field; and
   a processor configured to receive the first and second signals and to output a control signal, the processor including a first processing module configured to determine in a relative reference system fixed with respect to the body a relative gravitational field component derived from the first signal and a relative magnetic field component derived from the second signal, and a second processing module configured to determine the orientation of the body in an absolute reference system on the basis of the relative gravitational field components and the relative magnetic field components derived from the first processing module, the processor further configured to determine relative co-ordonates of three first vectors that are parallel to three respective axes of the absolute reference system on the basis of the relations $$U_1 = \frac{-G}{\|-G\|}$$

$$U_2 = \frac{-G \wedge M}{\|-G \wedge M)\|}$$

$$U_3 = \frac{-G \wedge (-G \wedge M)}{\|-G \wedge (-G \wedge M)\|}$$

where $U_1$, $U_2$, $U_3$ are the three first vectors, G is the Earth's gravitational field, and M is the Earth's magnetic field.

25. The device of claim 24, wherein the second processing module includes a first processing stage configured to determine in the relative reference system relative coordinates of three first vectors parallel to respective axes of the absolute reference system, and wherein the second processing module includes a second processing stage configured to determine on the basis of the three first vectors parallel to the respective axes of the absolute reference system a transformation operator configured to transform coordinates from the relative reference system to the absolute reference system.

26. The device of claim 25, wherein the second processing module includes a third processing stage to determine in the absolute reference system the absolute coordinates of three second vectors parallel to three respective axes of the relative reference system.

27. The device of claim 26, wherein the third processing stage is configured to determine a direction in the absolute reference system of a pointing vector fixed with respect to the body.

28. The device of claim 24, wherein the processor is configured to determine a pitch angle, a roll angle, and a yaw angle of the body, wherein the pitch angle and the roll angle are correlated to the first signals and the yaw angle is correlated to the second signals.

* * * * *